US012440080B2

(12) United States Patent
Lu et al.

(10) Patent No.: US 12,440,080 B2
(45) Date of Patent: Oct. 14, 2025

(54) ADJUSTABLE PARAMETERS FOR AUTONOMOUS CLEANING ROBOTS

(71) Applicant: iRobot Corporation, Bedford, MA (US)

(72) Inventors: Ping-Hong Lu, Auburndale, MA (US); Marcus Williams, Watertown, MA (US); Adam Goss, Lincoln, MA (US); Melissa O'Dea, Bedford, MA (US)

(73) Assignee: iRobot Corporation, Bedford, MA (US)

(*) Notice: Subject to any disclaimer, the term of this patent is extended or adjusted under 35 U.S.C. 154(b) by 204 days.

(21) Appl. No.: 18/151,863

(22) Filed: Jan. 9, 2023

(65) Prior Publication Data
US 2024/0225400 A1 Jul. 11, 2024

Related U.S. Application Data

(63) Continuation of application No. 16/536,903, filed on Aug. 9, 2019, now Pat. No. 11,547,264.

(60) Provisional application No. 62/840,884, filed on Apr. 30, 2019.

(51) Int. Cl.
*A47L 11/40* (2006.01)
*G05D 1/00* (2024.01)

(52) U.S. Cl.
CPC ....... *A47L 11/4011* (2013.01); *A47L 11/4061* (2013.01); *G05D 1/0016* (2013.01); *G05D 1/0044* (2013.01); *G05D 1/0088* (2013.01); *G05D 1/0219* (2013.01); *A47L 2201/04* (2013.01)

(58) Field of Classification Search
CPC .................. A47L 11/4011; A47L 2201/06
See application file for complete search history.

(56) References Cited

U.S. PATENT DOCUMENTS

| | | |
|---|---|---|
| 11,547,264 B2 | 1/2023 | Lu et al. |
| 2004/0204792 A1 | 10/2004 | Taylor et al. |
| 2005/0046373 A1 | 3/2005 | Aldred |
| 2005/0273967 A1 | 12/2005 | Taylor et al. |
| 2011/0271469 A1 | 11/2011 | Ziegler et al. |
| 2016/0282862 A1 | 9/2016 | Duffley et al. |

(Continued)

FOREIGN PATENT DOCUMENTS

| | | | |
|---|---|---|---|
| CN | 108937749 A | * 12/2018 | ............... A47L 11/28 |
| EP | 2572618 | 3/2023 | |

OTHER PUBLICATIONS

Machine translation: CN108937749; Wang, W. (Year: 2018).*

(Continued)

*Primary Examiner* — Natasha N Campbell
(74) *Attorney, Agent, or Firm* — Fish & Richardson P.C.

(57) ABSTRACT

A method of operating an autonomous cleaning robot includes presenting, on a display of a mobile device, a representation of each of multiple cleaning levels, each cleaning level corresponding to a respective rank overlap parameter for a wet cleaning mission of the autonomous cleaning robot. The method includes receiving, at the mobile device, an input indicative of a selection of one of the cleaning levels; and controlling the autonomous cleaning robot to execute a wet cleaning mission according to the rank overlap parameter corresponding to the selected one of the cleaning levels.

24 Claims, 11 Drawing Sheets

(56) References Cited

U.S. PATENT DOCUMENTS

2018/0284786 A1 10/2018 Moshkina-Martinson et al.
2020/0345193 A1 11/2020 Lu

OTHER PUBLICATIONS

"Braava Floor Mopping Robot: 300 Series Owner's Manual," iRobot Corp., Copyright 2008-2017, 28 pages.
"Braava Jet Owner's Guide," iRobot Corp., Copyright 2016-2017, 25 pages.
"Scooba 400 Series Owner's Manual," iRobot Corp., (undated), 32 pages.
Ansaldo, "iRobot Braava Jet 240 review: a mopping robot for small spaces," Techilive Review, Apr. 22, 2019. Retrieved on [Jun. 11, 2020]. Retrieved from: <URL: https://www.techhive.com/article/3389680/irobot-braava-jet-240-review.html>.
Davies, "Dyson 360 Eye Review: A great robo-vac with blind spots", Slashgear review article, 2016. Retrieved on Jun. 11, 2020. Retrieved from: <URL: https://www.slashgear.com/dyson-360-eye-review-a-great-robo-vac-with-blind-spots-05458933/>.
International Preliminary Report on Patentability in International Appln. No. PCT/US2020/028734, dated Nov. 11, 2021, 15 pages.
International Search Report and Written Opinion in International Appln. No. PCT/US2020/028734, dated Jul. 1, 2020, 16 pages.
Partial Supplementary European Search Report in European Appln. No. 20798214, mailed Jan. 10, 2023, 17 pages.
Extended European Search Report in European Appln. No. 20798214.1, mailed Apr. 12, 2023, 14 pages.

\* cited by examiner

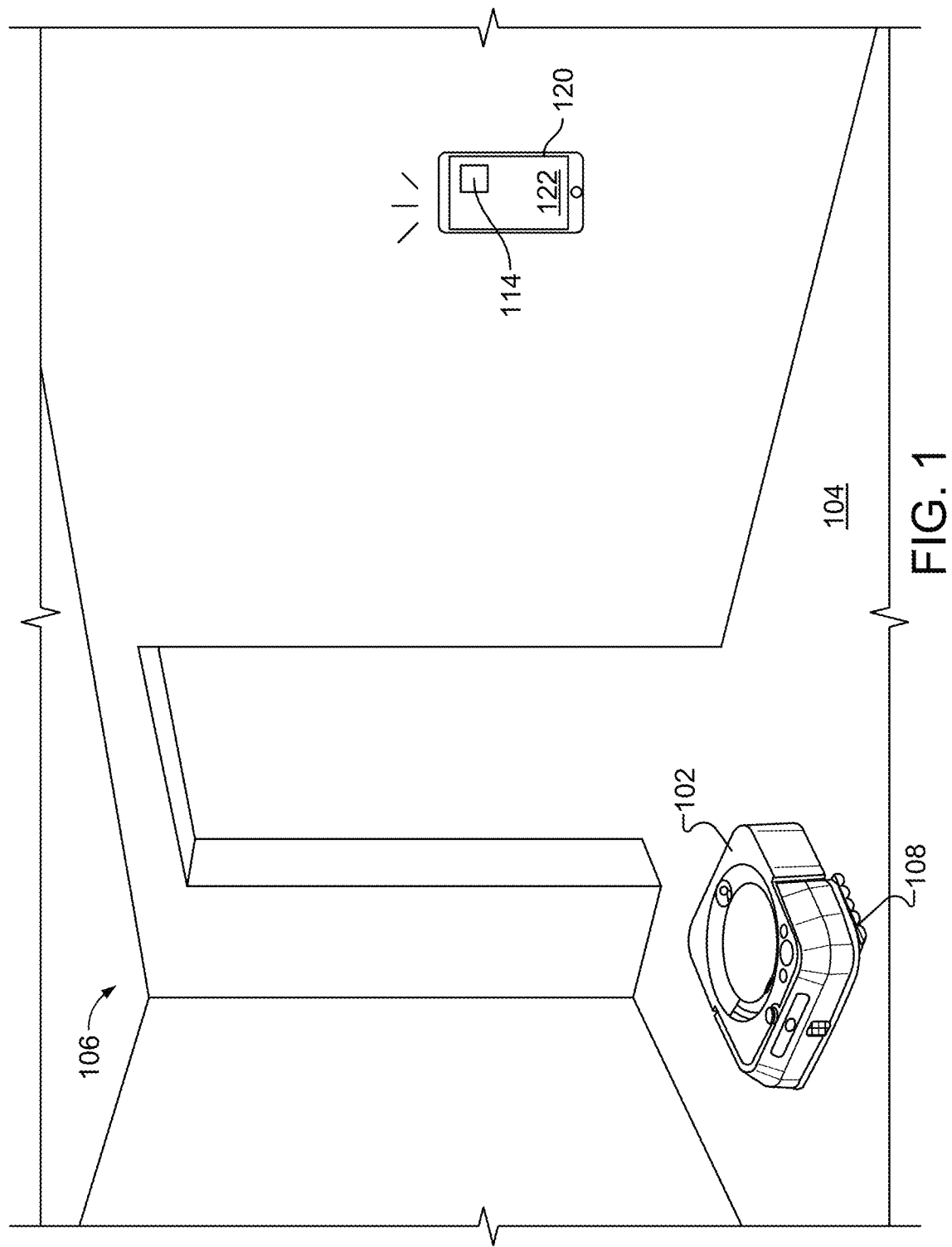

ADJUSTABLE PARAMETERS FOR AUTONOMOUS CLEANING ROBOTS

CLAIM OF PRIORITY

This application is a continuation application of, and claims priority to, U.S. patent application Ser. No. 16/536,903, filed on Aug. 9, 2019, which application claims the benefit under 35 U.S.C. § 119(e) of priority to U.S. Patent Application Ser. No. 62/840,884, filed on Apr. 30, 2019. The contents of each are incorporated herein by reference in their entirety.

BACKGROUND

Cleaning robots include mobile robots that autonomously perform cleaning tasks within an environment, e.g., a home. Many kinds of cleaning robots are autonomous to some degree and in different ways. The cleaning robots include a controller that is configured to autonomously navigate the cleaning robot about the environment such that the cleaning robot can ingest debris as it moves.

SUMMARY

Certain cleaning robots can travel back and forth in alternating lines (e.g., ranks) during a cleaning mission. An amount of overlap between ranks can contribute to a cleaning performance of the cleaning robot. A relatively large rank overlap can correspond to an increased cleaning performance and decreased coverage, while a relatively small rank overlap can correspond to decreased cleaning performance and increased coverage. The inventors have recognized, among other things, that it may be possible to provide an adjustable rank overlap in a cleaning robot, such as to provide for cleaning of rooms having different sizes or amounts of dirt or debris.

In an aspect, a method of operating an autonomous cleaning robot includes presenting, on a display of a mobile device, a representation of each of multiple cleaning levels, each cleaning level corresponding to a respective rank overlap parameter for a wet cleaning mission of the autonomous cleaning robot. The method includes receiving, at the mobile device, an input indicative of a selection of one of the cleaning levels; and controlling the autonomous cleaning robot to execute a wet cleaning mission according to the rank overlap parameter corresponding to the selected one of the cleaning levels.

Embodiments can include one or more of the following features.

The multiple cleaning levels include a first cleaning level corresponding to a first rank overlap parameter and a second cleaning level corresponding to a second rank overlap parameter greater than the first rank overlap parameter. The first rank overlap parameter corresponds to a rank overlap parameter in a range from 0% to 30% and the second rank overlap parameter corresponds to a rank overlap parameter in a range from 40% to 70%.

Presenting a representation of each of the multiple cleaning levels includes presenting one or more of (i) a radio button corresponding to each cleaning level and (ii) a slider bar having multiple positions, each position corresponding to one of the cleaning levels.

Presenting a representation of each of the multiple cleaning levels includes presenting a textual description of each of the cleaning levels.

The method includes presenting, on the display of the mobile device, a representation of each of multiple spray levels; and receiving, at the mobile device, an input indicative of a selection of one of the spray levels. Controlling the autonomous cleaning robot includes controlling the autonomous cleaning robot to execute the cleaning mission according to the selected spray level.

Controlling the autonomous cleaning robot to execute the cleaning mission according to the selected spray level includes controlling a volume of fluid ejected by a nozzle of the autonomous cleaning robot according to the selected spray level. The multiple spray levels include a first spray level corresponding to a first spray volume in a range from 200 µL to 500 µL and a second spray level corresponding to a second spray volume in a range from 400 µL to 1000 µL.

Controlling the autonomous cleaning robot to execute the cleaning mission according to the selected spray level includes controlling a spray frequency for ejection of fluid from a nozzle of the autonomous cleaning robot according to the spray level. The multiple spray levels include a first spray level corresponding to a first spray frequency in a range from one spray event per 300 mm to one spray event per 1400 mm and a second spray level corresponding to a second spray frequency in a range from one spray event per 1400 mm to one spray event per 2300 mm.

Presenting a representation of each of the multiple spray levels includes presenting a graphical representation of each of the multiple spray levels.

Presenting a representation of each of the multiple spray levels includes presenting one or more of (i) a slider bar having multiple positions, each position corresponding to one of the spray levels and (ii) a radio button corresponding to each of the spray levels.

The method includes controlling the autonomous cleaning robot to execute a spot cleaning mission of an area, including controlling the autonomous cleaning robot to navigate the area according to a first rank orientation; controlling the autonomous cleaning robot to navigate the area according to a second rank orientation different than the first rank orientation; and controlling the autonomous cleaning robot to navigate a perimeter of the area.

The method includes receiving, at the mobile device, an input to initiate the wet cleaning mission; and controlling the autonomous cleaning robot to execute the cleaning mission responsive to receiving the input.

Controlling the autonomous cleaning robot to perform the wet cleaning mission includes initiating a transmission to the autonomous cleaning robot including instructions to execute the wet cleaning mission according to the rank overlap parameter.

The method includes presenting, on the display of the mobile device, a summary of the wet cleaning mission, the summary including a representation of the selected cleaning level.

The method includes presenting, on the display of the mobile device, a summary of the wet cleaning mission, the summary including a map of an area cleaned by the autonomous cleaning robot during the wet cleaning mission.

In an aspect, a mobile device includes an input device; a display; and one or more processors configured to present, on the display, a representation of each of multiple cleaning levels, each cleaning level corresponding to a respective rank overlap parameter for a wet cleaning mission of an autonomous cleaning robot; receive data representing an input received through the input device, the input being indicative of a selection of one of the cleaning levels; and control the autonomous cleaning robot to perform a wet cleaning mission according to the rank overlap parameter corresponding to the selected one of the cleaning levels.

Embodiments can include one or more of the following features.

The multiple cleaning levels include a first cleaning level corresponding to a first rank overlap parameter and a second cleaning level corresponding to a second rank overlap parameter greater than the first rank overlap parameter. The first rank overlap parameter corresponds to a rank overlap parameter in a range from 0% to 30% and the second rank overlap parameter corresponds to a rank overlap parameter in a range from 40% to 70%.

The one or more processors are configured to present, on the display of the mobile device, a representation of each of multiple spray levels; and receive, at the mobile device, an input indicative of a selection of one of the spray levels, in which controlling the autonomous cleaning robot includes controlling the autonomous cleaning robot to execute the cleaning mission according to the selected spray level.

Controlling the autonomous cleaning robot to execute the cleaning mission according to the selected spray level includes controlling a volume of fluid ejected by a nozzle of the autonomous cleaning robot according to the selected spray level. The multiple spray levels include a first spray level corresponding to a first spray volume in a range from 200 µL to 500 µL and a second spray level corresponding to a second spray volume in a range from 400 µL to 1000 µL.

Controlling the autonomous cleaning robot to execute the cleaning mission according to the selected spray level includes controlling a spray frequency for ejection of fluid from a nozzle of the autonomous cleaning robot according to the spray level. The multiple spray levels include a first spray level corresponding to a first spray frequency in a range from one spray event per 300 mm to one spray event per 1400 mm and a second spray level corresponding to a second spray frequency in a range from one spray event per 1400 mm to one spray event per 2300 mm.

Controlling the autonomous cleaning robot to perform the wet cleaning mission includes initiating a transmission to the autonomous cleaning robot including instructions to execute the wet cleaning mission according to the rank overlap parameter.

In an aspect, a non-transitory computer readable medium stores instructions for causing one or more processors of a mobile device to present, on a display of the mobile device, a representation of each of multiple cleaning levels, each cleaning level corresponding to a respective rank overlap parameter for a wet cleaning mission of an autonomous cleaning robot; receive, at the mobile device, an input indicative of a selection of one of the cleaning levels; and control the autonomous cleaning robot to perform a wet cleaning mission according to the rank overlap parameter corresponding to the selected one of the cleaning levels.

The details of one or more implementations are set forth in the accompanying drawings and the description below. Other features and advantages will be apparent from the description and drawings, and from the claims.

BRIEF DESCRIPTION OF DRAWINGS

FIG. 1 is a diagram of an environment including an autonomous cleaning robot and a mobile device.

DETAILED DESCRIPTION

Figure 2A:
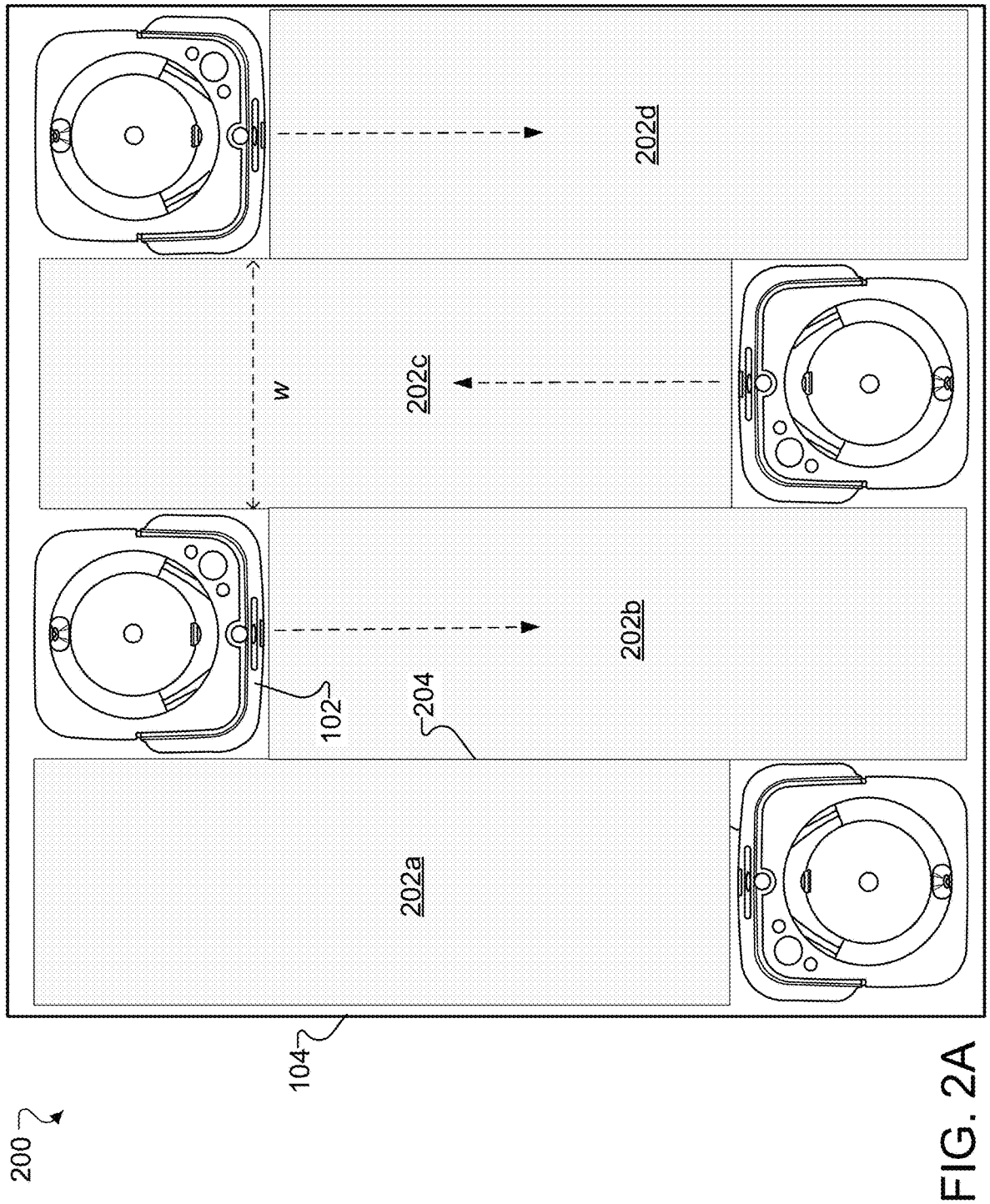
FIGS. 2A and 2B are diagrams of an autonomous cleaning robot executing cleaning missions.

Described herein are approaches to operating an autonomous cleaning robot in which a user can select or specify a characteristic, such as a strength or intensity characteristic, of a cleaning mission for the autonomous cleaning robot through a display of a mobile device. In some examples, the user can select from among multiple cleaning levels, with each cleaning level corresponding to a respective rank overlap parameter for a wet cleaning mission of the autonomous cleaning robot. In some examples, the user can select from among multiple spray levels, with each spray level corresponding to a respective amount of cleaning liquid or a respective frequency of ejection of the cleaning liquid. By enabling the user to select or specify characteristics of the cleaning mission through a display of a mobile device, the user can gain control over the cleaning mission without the need to specify precise parameter values for the characteristics.

Referring to FIG. 1, an autonomous cleaning robot 102 is located on a floor surface 104 within a room 106. In the example of FIG. 1, the autonomous cleaning robot 102 is a wet cleaning robot that employs a wet cleaning pad 108 configured to hold a cleaning fluid and to be used during a wet cleaning mission, e.g., a mopping mission. In some examples, the autonomous cleaning robot 102 can employ a dry cleaning pad configured to be used during a dry cleaning mission, e.g., for dusting or sweeping. In some examples, the autonomous cleaning robot 102 can be a vacuum cleaning robot configured to execute a vacuum cleaning mission. In some examples, the autonomous cleaning robot 102 can be configured for both vacuum cleaning and wet cleaning or for both vacuum cleaning and dry cleaning.

The autonomous cleaning robot 102 is configured to communicate with a mobile device 120, such as a smart phone, a cellular phone, personal digital assistant, laptop computer, tablet, smart watch, or other portable (e.g., hand-held) computing device capable of transmitting and receiving signals related to a robot cleaning mission. The mobile device 120 includes one or more processors 114 configured to initiate data transmission and reception (via the internet, etc.) with the autonomous cleaning robot 102 and run a mobile application.

The mobile device 120 is configured to present, on a display 122, information relating to a cleaning mission of the autonomous cleaning robot 102 and to receive an input from a user. In some examples, the mobile device 120 is configured to receive input from a user indicative of a selection or specification of a characteristic of a cleaning mission, such as a wet cleaning mission, to be performed by the autonomous cleaning robot 102. The characteristic of the cleaning mission can relate to the strength or intensity of the cleaning mission. For instance, the characteristic of the cleaning mission can be a rank overlap parameter or other navigational parameter, or a spray level parameter or other cleaning parameter of the autonomous cleaning robot.

The mobile device 120 can be configured to present a representation of each of multiple options for one or more cleaning characteristics, e.g., the rank overlap parameter or the spray level parameter. The representations of the options can be graphical or textual representations of the options, and in some examples do not specify the actual values of the parameters corresponding to the options. For instance, options for the spray level parameter can indicate relative amounts or frequencies of the spraying of cleaning fluid (e.g., high, medium, and low options) without specifying the value corresponding to each of the options.

Figure 2B:
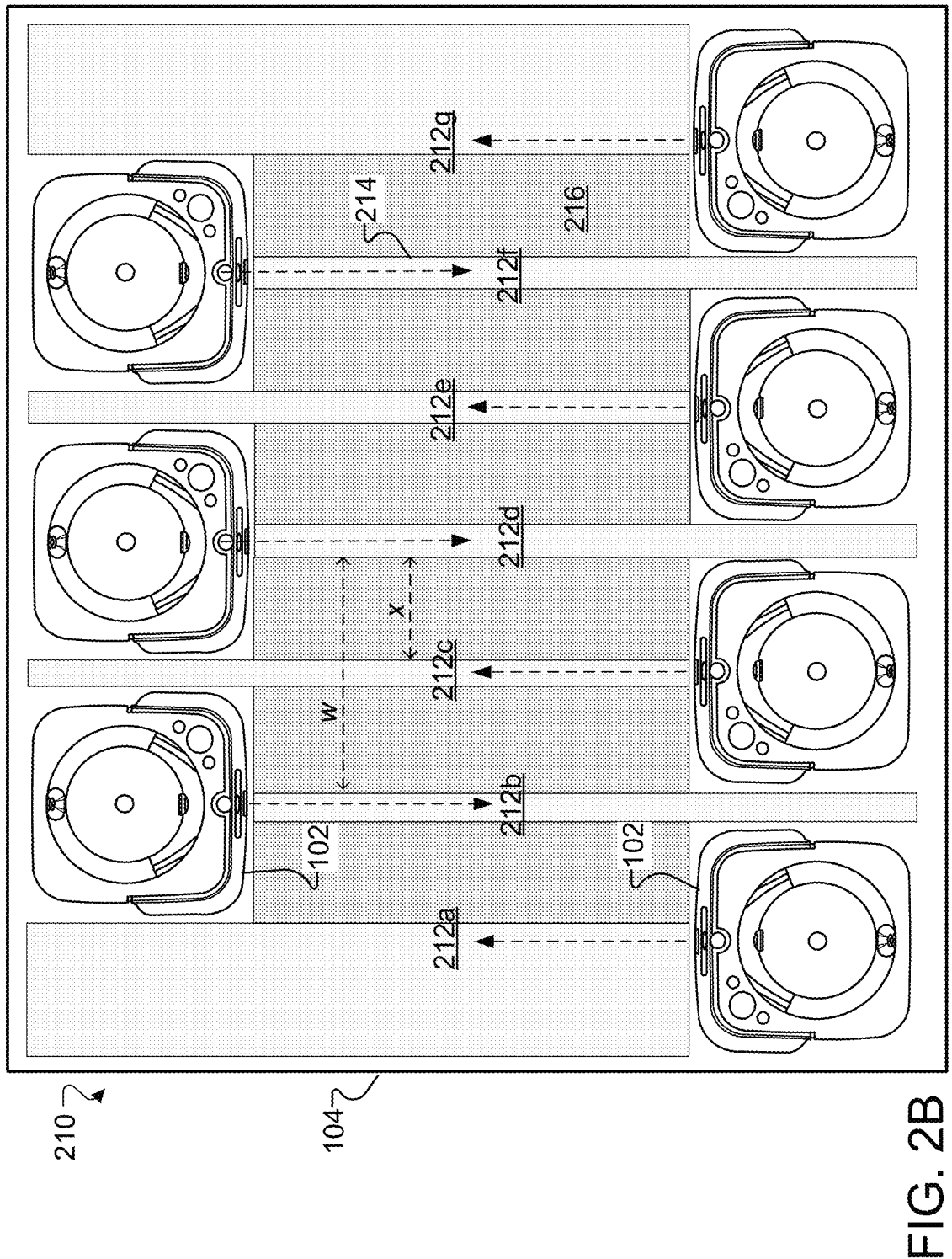

Referring to FIGS. 2A and 2B, the autonomous cleaning robot 102 can execute a cleaning mission by moving in a series of generally straight paths, referred to as ranks (e.g., ranks 202a-202d of FIG. 2A), that are substantially parallel to one another. The rank overlap parameter of the cleaning mission indicates the degree to which a successive rank overlaps the previous rank of the cleaning mission. A cleaning mission executed according to a high rank overlap parameter, meaning a high degree of overlap between adjacent ranks, provides deeper cleaning than a cleaning mission executed according to a low rank overlap parameter.

FIG. 2A depicts a cleaning mission 200 of the autonomous cleaning robot 102 in which the autonomous cleaning robot navigates the floor surface 104 along the rank 202a, followed sequentially by navigation along the ranks 202b, 202c, and 202d. Each rank 202a-202d has a width w. The cleaning mission 200 of FIG. 2A is executed according to a rank overlap parameter of zero, in which there is substantially no overlap between successive ranks (e.g., between ranks 202a and 202b). In a cleaning mission with a zero rank overlap parameter, each successive rank is adjacent to the previous rank such that a left edge of each successive rank (e.g., a left edge 204 of the rank 202b) is aligned with a right edge of the previous rank (e.g., a right edge 206 of the rank 202a).

FIG. 2B depicts a cleaning mission 210 of the autonomous cleaning robot 102 in which the autonomous cleaning robot navigates the floor surface 104 along the rank 212a, followed sequentially by navigation along the ranks 212b-212g. Each rank 212a-212g has width w. The cleaning mission 210 of FIG. 2B is executed according to a rank overlap parameter of about 40%, in which the overlap x of each successive rank (e.g., rank 202c) is 40% of the width w of the previous rank (e.g., rank 202d). In a cleaning mission with a non-zero rank overlap parameter, each successive rank overlaps with at least a portion of the previous rank such that a left edge of each successive rank is located in the area of the previous rank. For instance, a left edge 214 of the rank 212g is located in the area of the rank 212f, creating an overlap region 216 that is cleaned twice during the cleaning mission 210. In a cleaning mission with a higher rank overlap parameter (e.g., the cleaning mission 210 of FIG. 2B), the autonomous cleaning robot 102 passes over at least a portion of the floor surface 104 multiple times, providing deeper cleaning of the floor surface than is achieved in a cleaning mission with a lower rank overlap parameter (e.g., the cleaning mission 200 of FIG. 2A), in which less of the floor surface 104 is cleaned multiple times.

A user can select a rank overlap parameter for a cleaning mission by providing an input into a mobile device. The mobile device can be configured to present preset cleaning mission options, e.g., preset cleaning mission intensities, each corresponding to a respective rank overlap parameter, such that the user need not specify a quantitative value of the rank overlap parameter. In one example, a preset cleaning mission option for light cleaning can correspond to a rank overlap parameter value in the range of about 0-30%, a preset cleaning mission option for moderate cleaning can correspond to a rank overlap parameter value in the range of about 30-60%, and a preset cleaning mission option for deep cleaning can correspond to a rank overlap parameter value in the range of about 60-100%. In one example, a preset cleaning mission option for light cleaning can correspond to a rank overlap parameter in the range of about 0-30% and a preset cleaning mission option for deep cleaning can correspond to a rank overlap parameter in the range of about 40-70%.

Figure 3B:
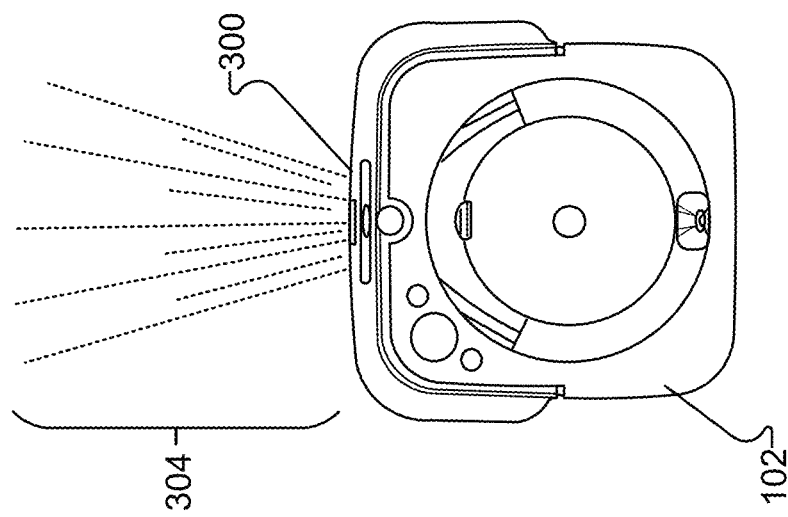
FIGS. 3A and 3B are diagrams of an autonomous cleaning robot.
Figure 3A:
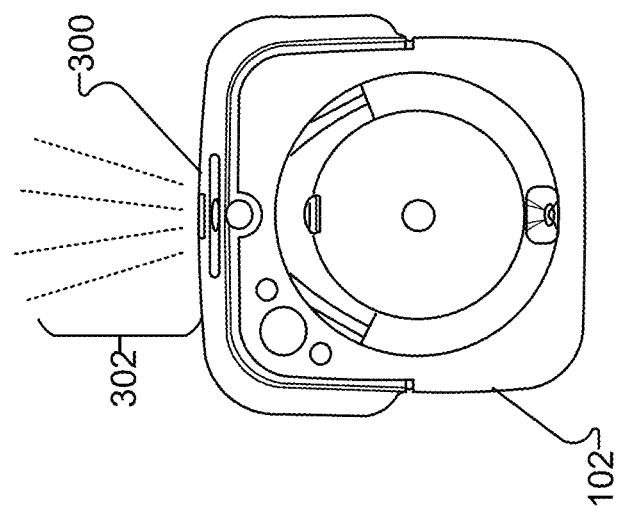

Referring to FIGS. 3A and 3B, the autonomous cleaning robot 102 executing a wet cleaning mission sprays cleaning fluid from one or more nozzles 300 onto the floor surface, e.g., in front of the autonomous cleaning robot 102, in a forward direction, a downward direction, or both. Once the cleaning fluid has been sprayed onto the floor surface, the autonomous cleaning robot 102 can move over the cleaning fluid, e.g., to moisten the cleaning pad 108, to scrub the floor surface, or both. The spray level parameter indicates a characteristic of the spray of cleaning fluid, such as a volume of fluid sprayed from the nozzles or a frequency of the spraying, e.g., as defined by a distance traveled by the autonomous cleaning robot between each spray event. A cleaning mission executed according to a high spray parameter provides deeper cleaning than a cleaning mission executed according to a low spray parameter.

FIG. 3A depicts a spray 302 of cleaning fluid sprayed from the autonomous cleaning robot 102 according to a low spray volume. FIG. 3B depicts a spray 304 of cleaning fluid sprayed from the autonomous cleaning robot 102 according to a high spray volume.

A user can select a spray parameter for a cleaning mission by providing an input into a mobile device. The mobile device can be configured to present preset cleaning mission options, e.g., preset cleaning mission intensities, each corresponding to a respective spray parameter, such that the user need not specify a quantitative value of the spray parameter.

In some examples, the spray frequency can range from one spray event per 300 mm travelled to one spray event per 2500 mm travelled. In an example, three preset cleaning options can be provided. The preset cleaning mission option for light cleaning can correspond to a spray frequency in the range of one spray event per 300 mm to one spray event per 900 mm, a preset cleaning mission option for moderate cleaning can correspond to a spray frequency in the range of one spray event per 900 mm to one spray event per 1500 mm, and a preset cleaning mission option for deep cleaning can correspond to a spray frequency in the range of one spray event per 1500 mm to one spray event per 2100 mm. In one example, a preset cleaning mission option for light cleaning can correspond to a spray frequency in the range of one spray event per 300 mm to one spray event per 1400 mm and a preset cleaning mission option for deep cleaning can correspond to a spray frequency in the range of one spray event per 1400 mm to one spray event per 2300 mm.

In some examples, the volume of fluid sprayed from the nozzle can range from about 200 µL per spray event to about 1000 µL per spray event. In one example, a preset cleaning mission option for light cleaning can correspond to a spray parameter value that is about 50% of a maximum spray volume, e.g., in the range of about 200 µL to about 500 µL, a preset cleaning mission option for moderate cleaning can correspond to a spray parameter value that is about 75% of a maximum spray volume, e.g., in the range of about 350 µL to about 750 µL, and a preset cleaning mission option for deep cleaning can correspond to a spray parameter value of the maximum spray volume, e.g., in the range of about 500 µL to about 1000 µL. In one example, a preset cleaning mission option for light cleaning can correspond to a spray parameter value that is about 50% of a maximum spray volume, e.g., in the range of about 200 μL to about 500 μL, and a preset cleaning mission option for deep cleaning can correspond to a spray parameter value of the maximum spray volume, e.g., in the range of about 400 μL to about 1000 μL.

Figure 4A:
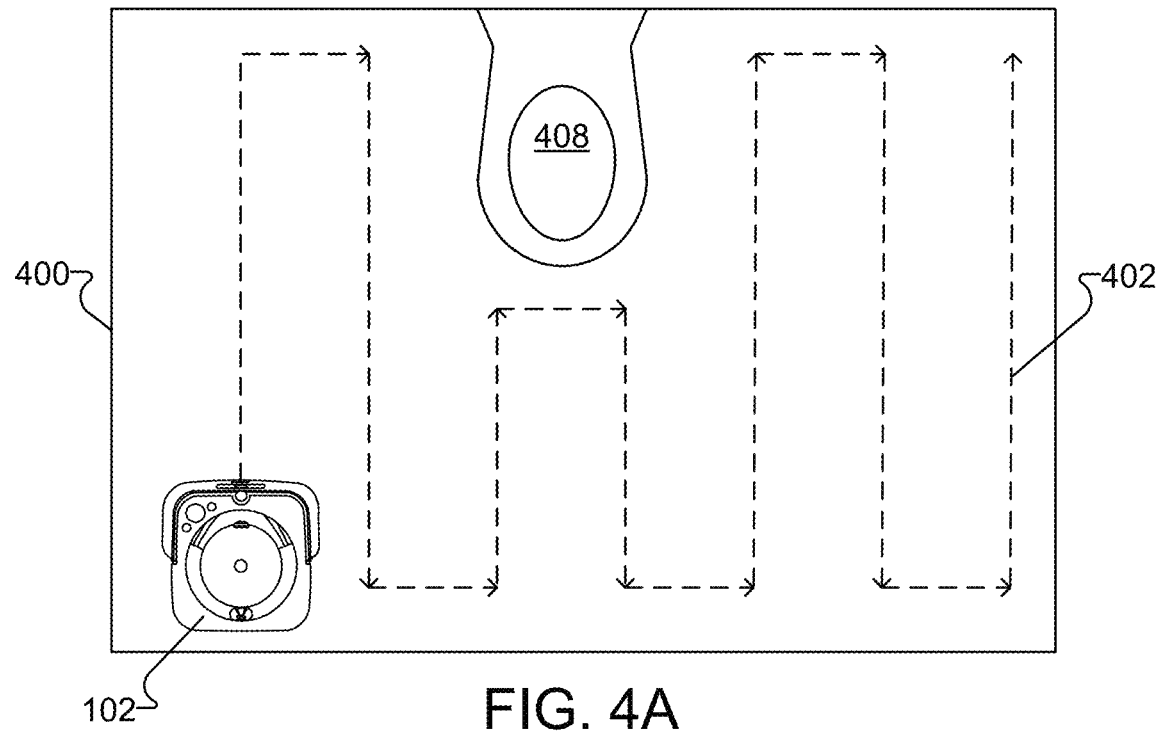
FIGS. 4A-4C are diagrams of an autonomous cleaning robot executing a spot cleaning mission.
Figure 4B:
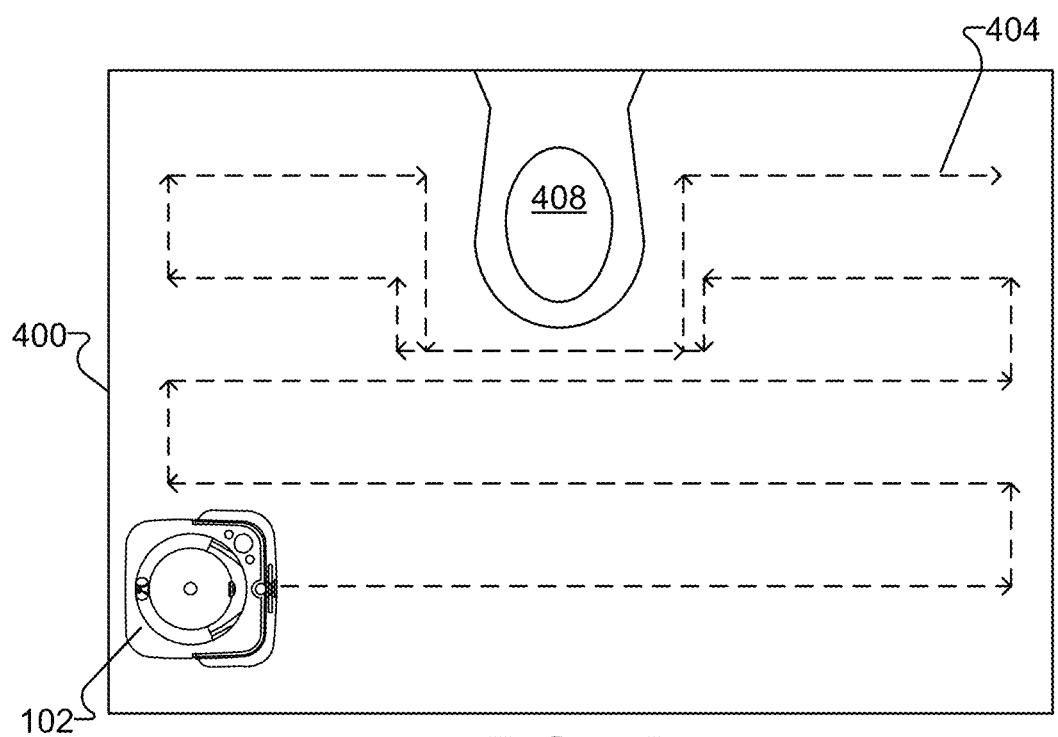
Figure 4C:
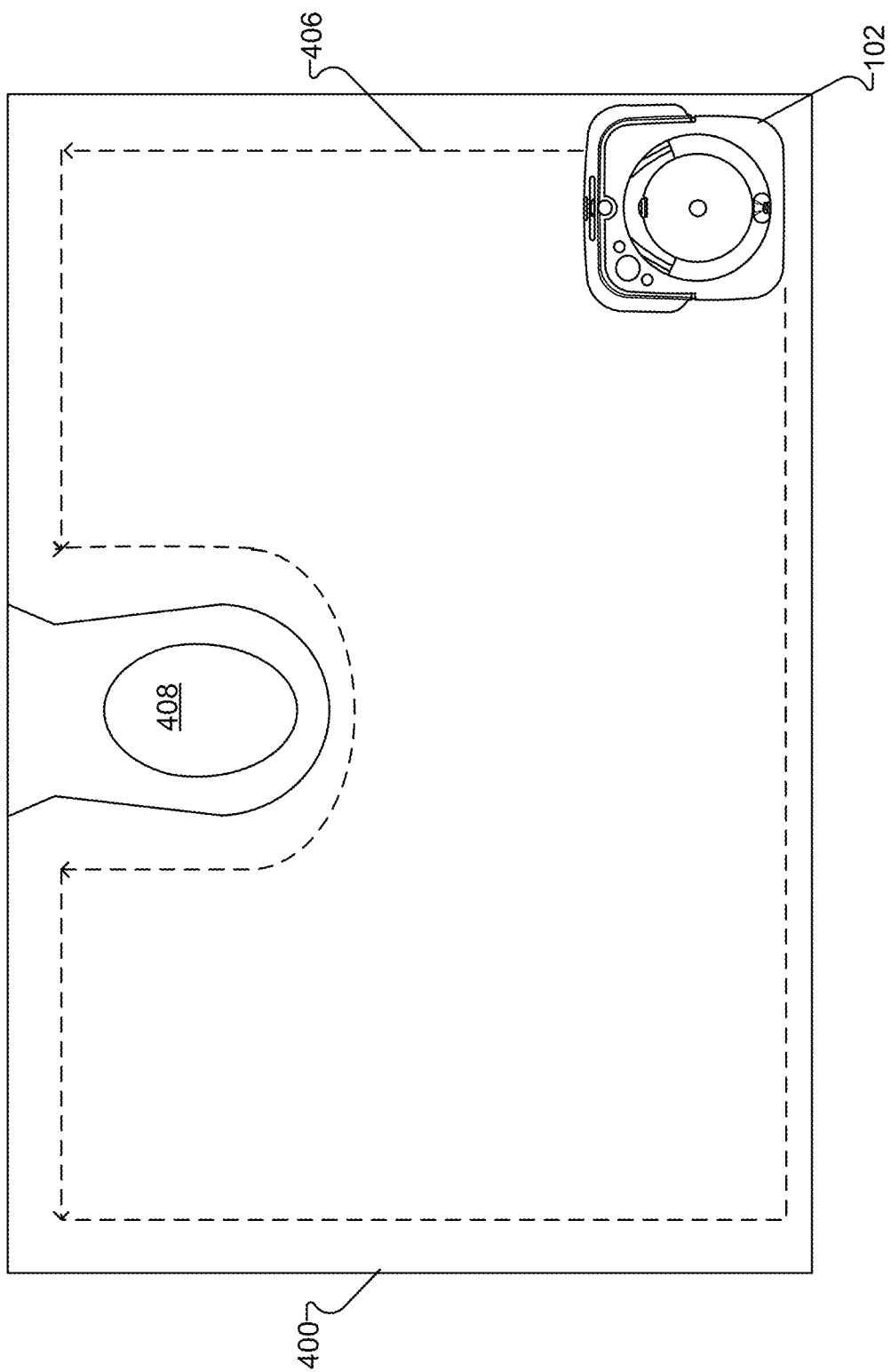

Referring to FIGS. 4A-4C, in some examples, the autonomous cleaning robot 102 can be operated in a spot cleaning mode in which the autonomous cleaning robot 102 executes a cleaning mission to clean an area of a predefined size, such as between about 4 ft$^2$ and about 16 ft$^2$. In spot cleaning mode, the autonomous cleaning robot 102 first cleans the area 400 by navigating along a first set of ranks 402 oriented in a first direction, as shown in FIG. 4A. The autonomous cleaning robot 102 then cleans the area 400 by navigating along a second set of ranks 404 oriented in a second direction, as shown in FIG. 4B. In some examples, the second set of ranks 404 is oriented substantially perpendicular to the first set of ranks 402. To finish, the autonomous cleaning robot navigates around a perimeter 406 of the area 400, including navigating around obstacles 408 present along the perimeter. Execution of a cleaning mission in spot cleaning mode can be initiated responsive to user input into a mobile device. In some examples of spot cleaning mode, the order of the first set of ranks 402, the second set of ranks 404, and the perimeter 406 can be varied. In some examples of spot cleaning mode, the rank overlap parameter, spray level parameter, or both can be fixed; in some examples, the rank overlap parameter, spray level parameter, or both can be set by user input.

Figure 5:
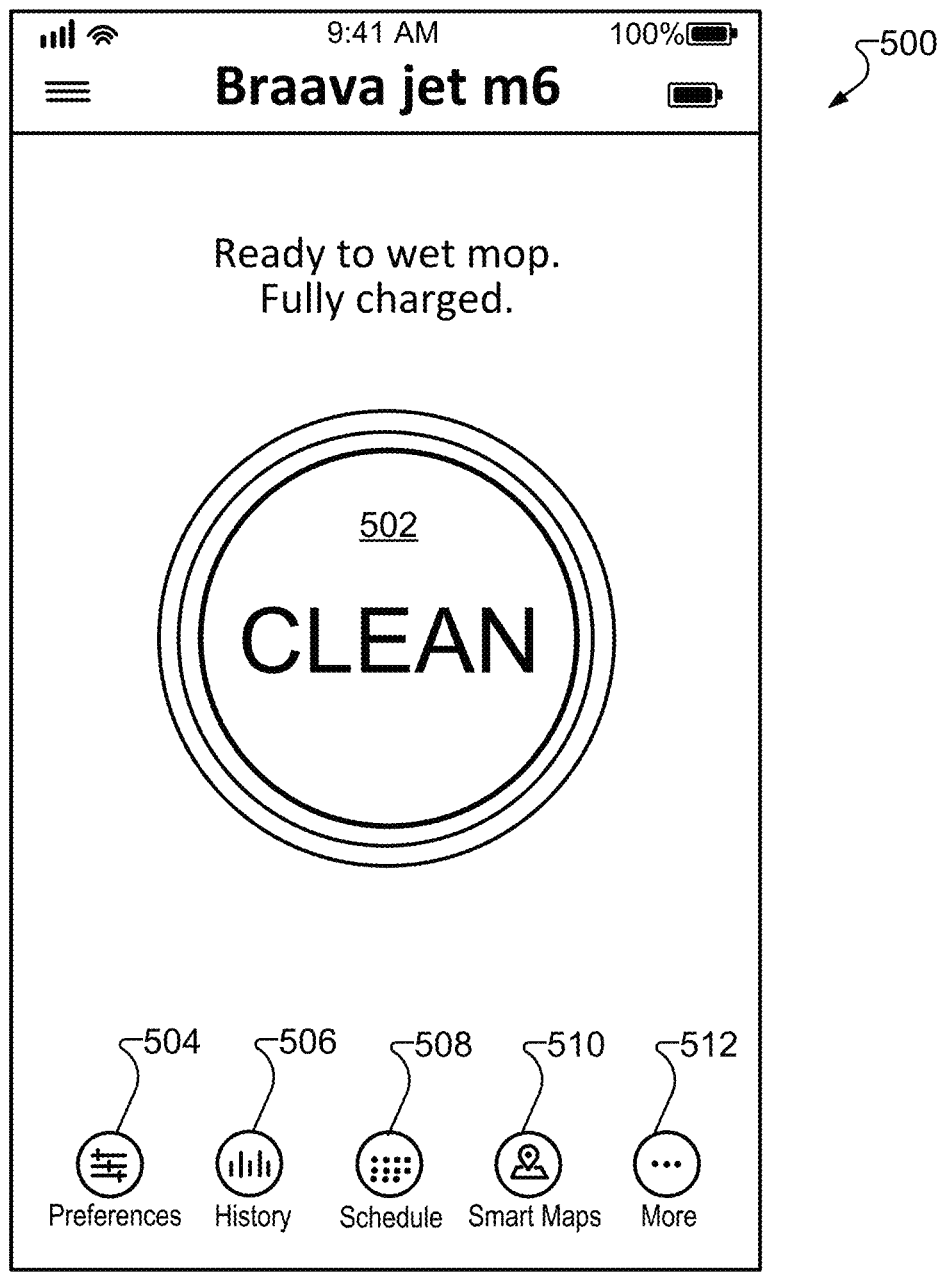
FIG. 5 is a diagram of a user interface.

Referring to FIG. 5, a user interface 500 of an application is presented on a display of a mobile device and provides a user with access to controls for the autonomous cleaning robot. A main control feature 502 enables the user to start and stop a cleaning mission. Other features accessible through the user interface 500 include a preferences feature 504 for setting cleaning preferences or application preferences; a history feature 506 for providing access to information indicative of past cleaning missions; a schedule feature 508 for setting a schedule of cleaning missions; a maps feature 510 for providing access to map information; and other features, such as a "more" feature 512.

Figure 6:
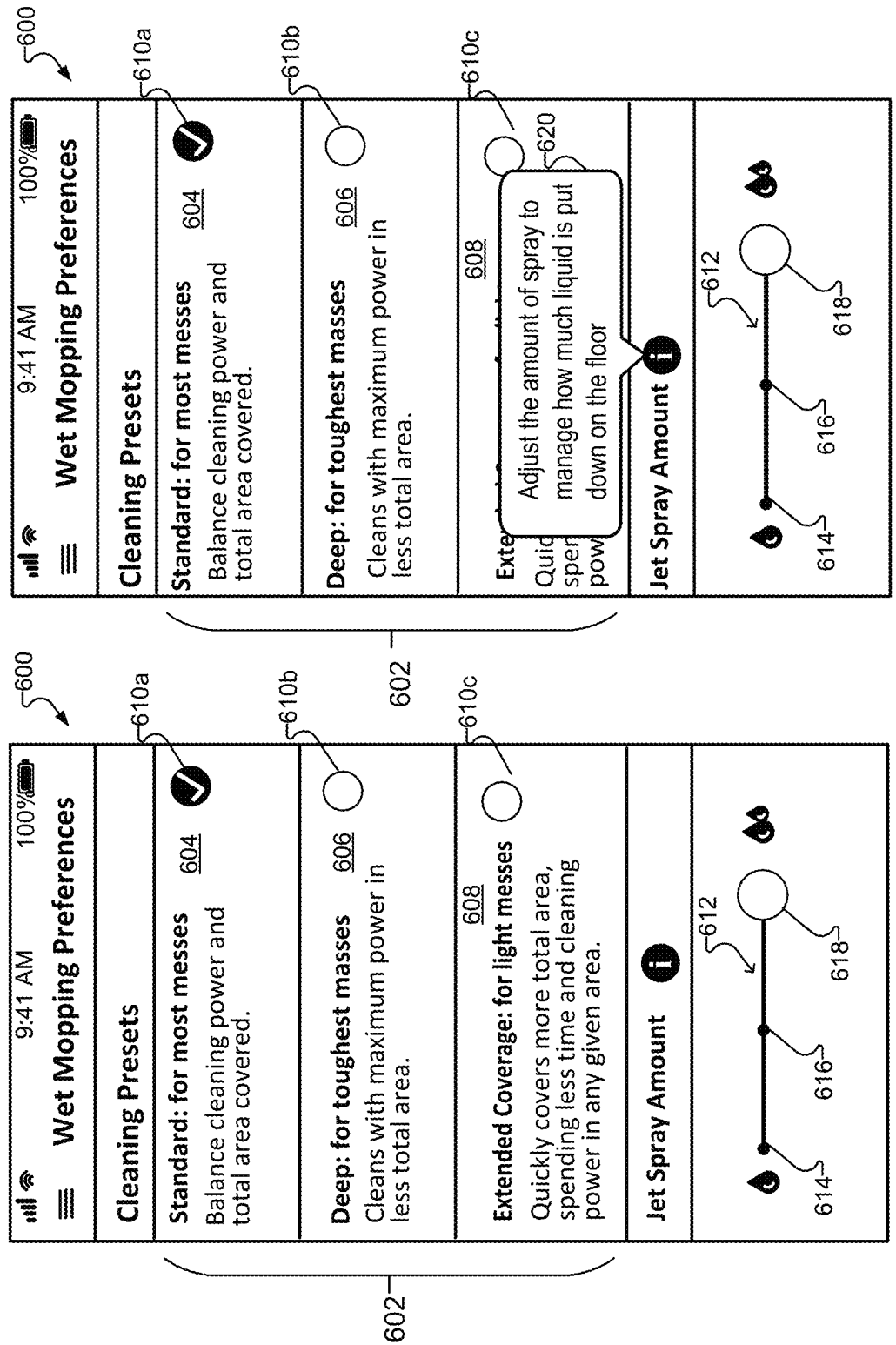
FIGS. 6A and 6B are diagrams of user interfaces.

Referring to FIGS. 6A and 6B, a user interface 600 of the application provides a user with the ability to set the cleaning level, spray level, or both, for a cleaning mission of the autonomous cleaning robot. The user interface 600 can be accessed through the preferences feature 504 of the user interface 500 (FIG. 5).

The user interface 600 includes a representation 602 of each of multiple cleaning levels, each cleaning level corresponding to a respective rank overlap parameter. In the example of FIGS. 6A and 6B, a first cleaning level 604 corresponds to a first rank overlap parameter, a second cleaning level 606 corresponds to a second rank overlap parameter greater than the first rank overlap parameter, and a third cleaning level 608 corresponds to a third rank overlap parameter less than the first rank overlap parameter. In the example of FIGS. 6A and 6B, the representation of each cleaning level includes a radio button 610a, 610b, 610c and a textual description of the respective cleaning level. In some examples, the representation can be, e.g., a slider bar having multiple positions, with each position corresponding to one of the cleaning levels.

The user interface 600 also includes a graphical representation of each of multiple spray levels. In the example of FIGS. 6A and 6B, the graphical representation includes a slider bar 612 having multiple positions 614, 616, 618, each position corresponding to one of the spray levels. In some examples, the representation can be, e.g., radio buttons or textual descriptions. In the example of FIGS. 6A and 6B, each spray level corresponds to a respective amount of fluid sprayed from the nozzles of the autonomous cleaning robot, as described in an information bubble 620. In some examples, each spray level can correspond to a respective ejection frequency for ejection of fluid from the nozzles of the autonomous cleaning robot.

Figure 7:
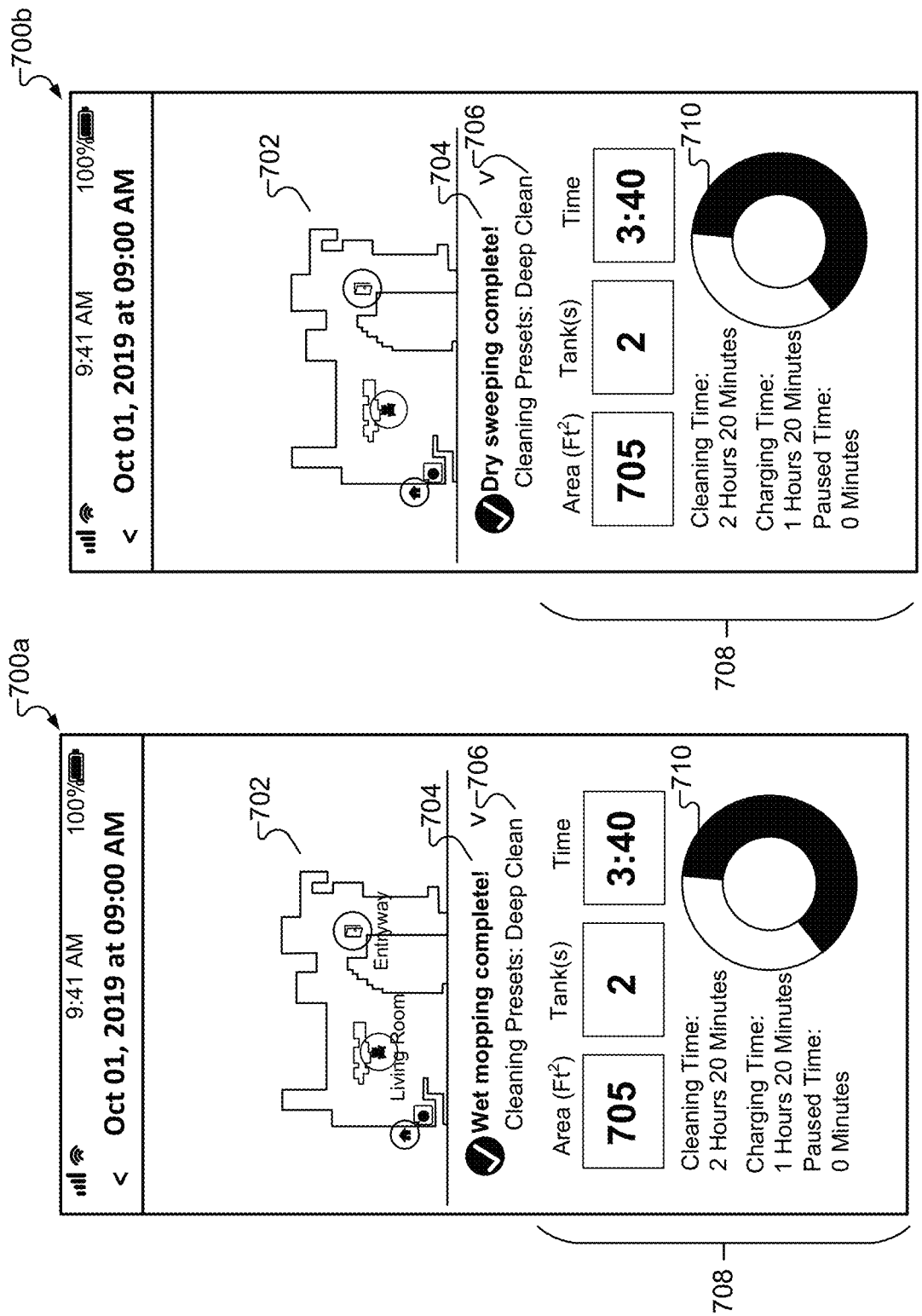
FIGS. 7A and 7B are diagrams of user interfaces.

Referring to FIGS. 7A and 7B, the application provides information about a previously executed cleaning mission. In the example of FIG. 7A, a user interface 700a provides information about a previously executed wet cleaning mission; in the example of FIG. 7B, a user interface 700b provides information about a previously executed sweeping mission. The user interfaces 700a, 700b are sometimes referred to collectively as a user interface 700.

The user interface 700 provides a map 702 of an area cleaned during the cleaning mission, information 704 about a type (e.g., wet mopping or dry sweeping) of the cleaning mission, and information 706 about a cleaning level of the cleaning mission. The user interface 700 provides cleaning mission statistics 708, including an area of the cleaning mission, a number of tanks of cleaning fluid used during the cleaning mission, a total elapsed time for the cleaning mission, a cleaning time, a charging time, and a paused time. The user interface 700 provides a graphical representation 710 of the cleaning time and charging time as a portion of the total elapsed time; in some examples, additional information can be represented graphically.

Figure 8:
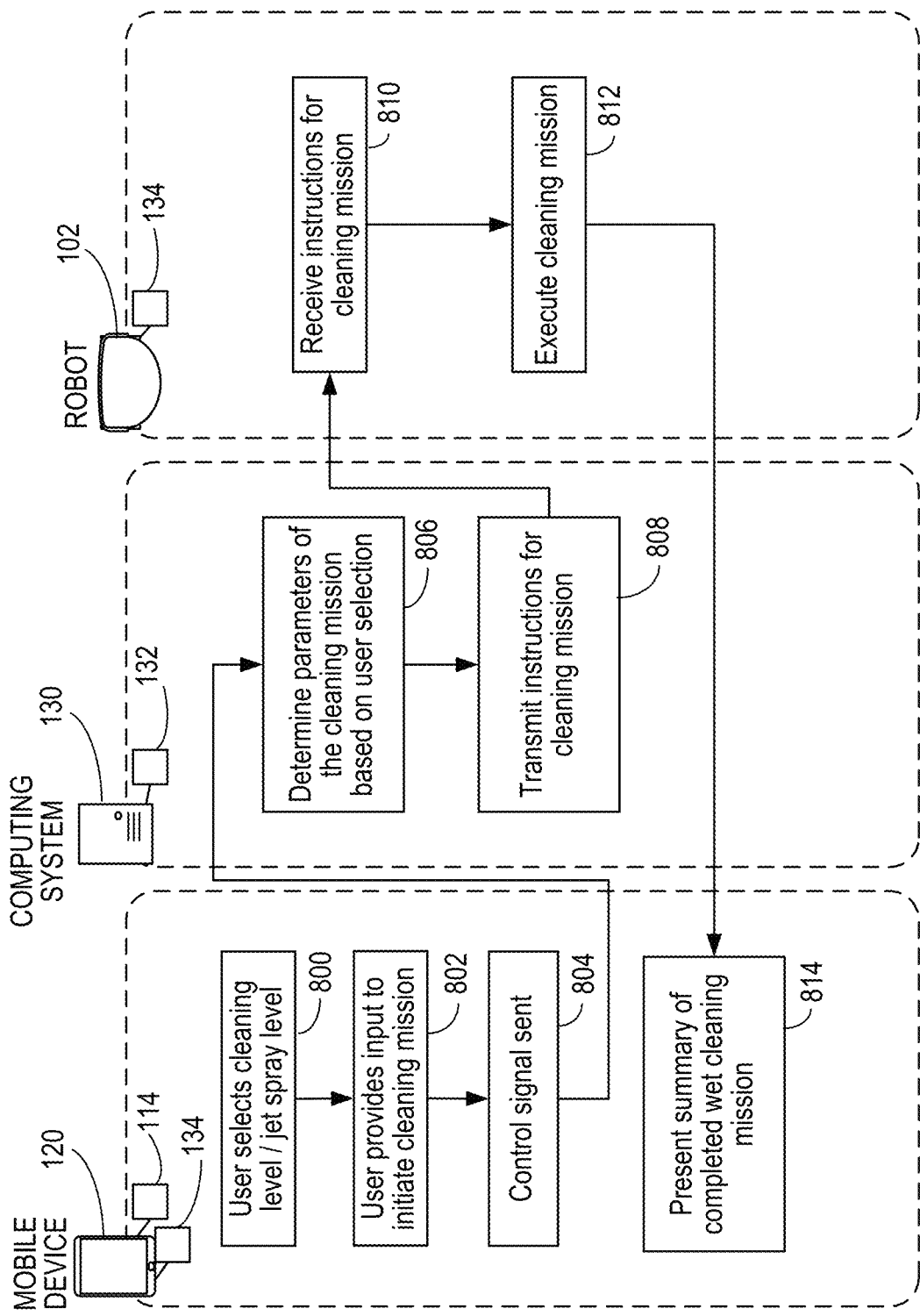
FIG. 8 is a process flow diagram.

Referring to FIG. 8, in an example process flow for causing the autonomous cleaning robot 102 to execute a cleaning mission, a user selects (800) a cleaning level, a spray level, or both, via an input into a user interface of the mobile device 120, e.g., through an application 134 executed by the one or more processors 114 of the mobile device 120. The user provides (802) an input to initiate the cleaning mission. Responsive to receiving the user input, the one or more processors 114 of the mobile device 120 control the sending of a control signal (804) from the mobile device 120 to a computing system 130 having one or more processors 132. In some examples, the computing system 130 can be a cloud-based computing system.

One or more parameters of the cleaning mission are determined (806) by the computing system 130 based on the selected cleaning level, spray level, or both. When the user selection indicates a cleaning level, the computing system 130 determines the rank overlap parameter corresponding to the selected cleaning level. When the user selection indicates a spray level, the computing system 130 determines the spray level parameter (e.g., spray volume or spray frequency) corresponding to the selected spray level. A transmission is initiated (808) from the computing system 130 to the autonomous cleaning robot 102, the transmission including instructions to execute the cleaning mission according to the one or more determined parameters.

The autonomous cleaning robot 102 receives (810) the instructions and the one or more processors 132 of the autonomous cleaning robot 102 cause the autonomous cleaning robot 102 to execute (812) the cleaning mission according to the instructions. For instance, the autonomous cleaning robot 102 can execute the cleaning mission according to the rank overlap parameter corresponding to the selected cleaning level, the spray level parameter corresponding to the selected spray level, or both.

In some examples, during the cleaning mission or following completion of the cleaning mission, the autonomous cleaning robot 102 transmits information summarizing the cleaning mission for presentation (814) on the display of the mobile device 120, e.g., via a wireless Internet connection or a short-range communications protocol. In some examples, the autonomous cleaning robot 102 transmits information summarizing the cleaning mission to the computing system 130.

Figure 9:
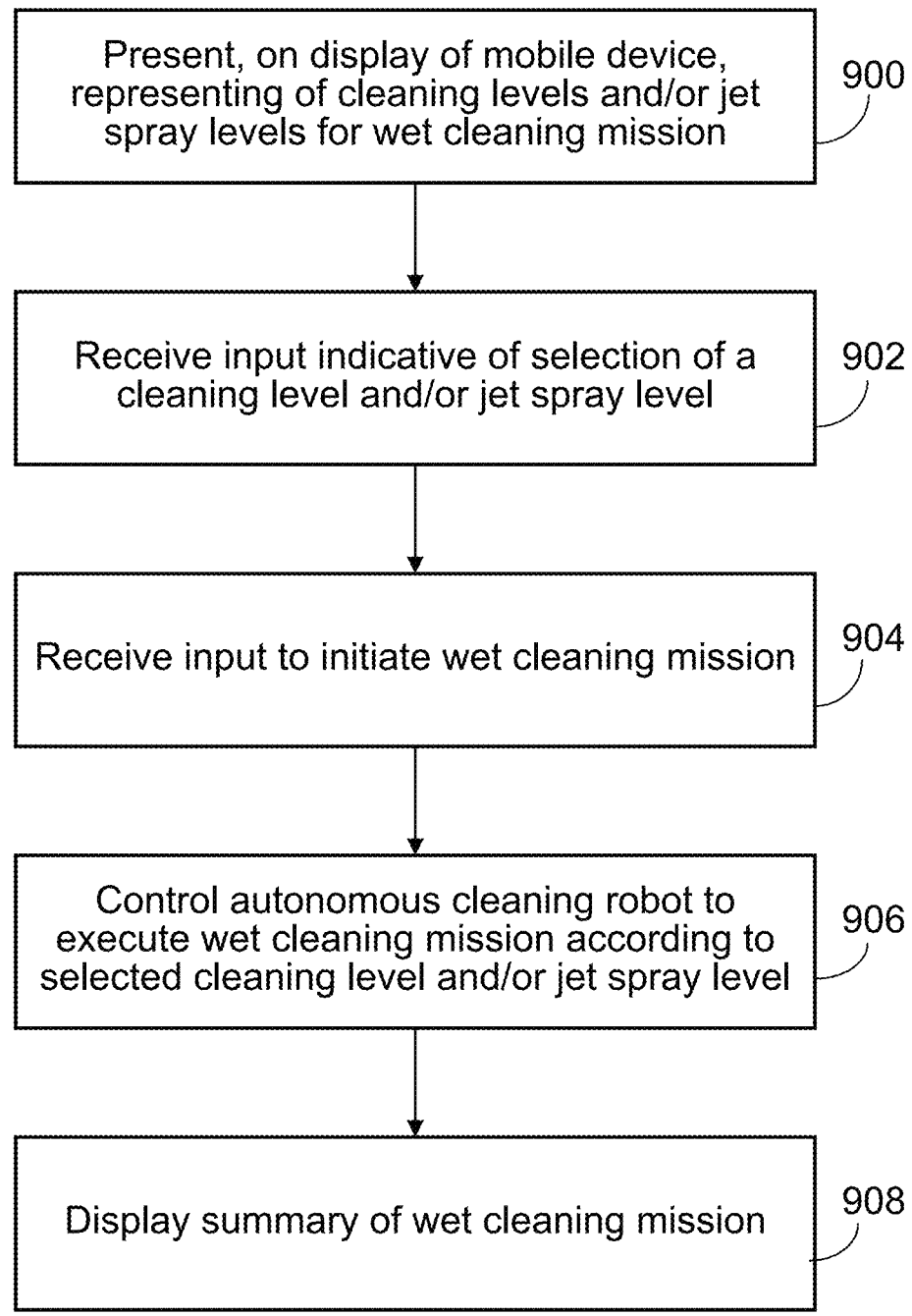
FIG. 9 is a flowchart.

Referring to FIG. 9, in an example method of operating an autonomous cleaning robot, a representation of each of multiple cleaning levels is presented on a display of a mobile device (900). Each cleaning level corresponds to a respective rank overlap parameter for a wet cleaning mission of the autonomous cleaning robot. For instance, the multiple cleaning levels can include a first level corresponding to a first rank overlap parameter, e.g., in a range from about 0%-30%; and a second level corresponding to a second rank overlap parameter greater than the first rank overlap parameter, e.g., in a range from about 40%-70%. The representation of each of the cleaning levels can be presented as a radio button or a slider bar or as a textual description of each of the cleaning levels.

In some examples, a representation of each of multiple spray levels is presented on the display of the mobile device. Each spray level can correspond to a respective amount of fluid ejected by a nozzle of the autonomous cleaning robot or to a respective ejection frequency for ejection of fluid from a nozzle of the autonomous cleaning robot. The representation of each of the spray levels can be presented as a radio button or a slider bar or as a textual description of each of the spray levels.

An input is received at the mobile device indicative of a selection of one of the cleaning levels (902). When a representation of each of multiple spray levels is presented, an input indicative of a selection of one of the spray levels is received.

An input to initiate the wet cleaning mission is received at the mobile device (904). The autonomous cleaning robot is controlled to execute the wet cleaning mission according to the rank overlap parameter corresponding to the selected cleaning level, the selected spray level, or both (906). For instance, a transmission to the autonomous cleaning robot is initiated, the transmission including instructions to execute the wet cleaning mission according to the rank overlap parameter corresponding to the selected cleaning level, the selected spray level, or both.

A summary of the wet cleaning mission is presented on the display of the mobile device (908). The summary can include a representation of the selected cleaning level or selected spray level, or a map of an area cleaned by the autonomous cleaning robot during the wet cleaning mission.

The robots and techniques described herein, or portions thereof, can be controlled by a computer program product that includes instructions that are stored on one or more non-transitory machine-readable storage media, and that are executable on one or more processing devices to control (e.g., to coordinate) the operations described herein. The robots described herein, or portions thereof, can be implemented as all or part of an apparatus or electronic system that can include one or more processing devices and memory to store executable instructions to implement various operations.

Operations associated with implementing all or part of the robot operation and control described herein can be performed by one or more programmable processors executing one or more computer programs to perform the functions described herein. For example, the mobile device, a cloud computing system configured to communicate with the mobile device and the autonomous cleaning robot, and the robot's controller may all include processors programmed with computer programs for executing functions such as transmitting signals, computing estimates, or interpreting signals. A computer program can be written in any form of programming language, including compiled or interpreted languages, and it can be deployed in any form, including as a stand-alone program or as a module, component, subroutine, or other unit suitable for use in a computing environment.

The controllers and mobile devices described herein can include one or more processors. Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer include one or more processors for executing instructions and one or more storage area devices for storing instructions and data. Generally, a computer will also include, or be operatively coupled to receive data from, or transfer data to, or both, one or more machine-readable storage media, such as mass PCBs for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

The robot control and operating techniques described herein may be applicable to controlling other mobile robots aside from cleaning robots. For example, a lawn mowing robot or a space-monitoring robot may be trained to perform operations in specific portions of a lawn or space as described herein.

Elements of different implementations described herein may be combined to form other implementations not specifically set forth above. Elements may be left out of the structures described herein without adversely affecting their operation. Furthermore, various separate elements may be combined into one or more individual elements to perform the functions described herein.

What is claimed is:

1. A method of operating an autonomous cleaning robot, the method comprising:
   presenting, on a display of a mobile device, a representation of each of multiple spray levels;
   receiving, at the mobile device, an input indicative of a selection of one of the spray levels; and
   controlling the autonomous cleaning robot to execute a wet cleaning mission according to the selected spray level, including controlling a distance traveled by the autonomous cleaning robot between consecutive ejections of fluid from a nozzle of the autonomous cleaning robot according to the selected spray level.

2. The method of claim 1, wherein controlling the autonomous cleaning robot to execute the wet cleaning mission according to the selected spray level comprises controlling a volume of fluid ejected by the nozzle of the autonomous cleaning robot according to the selected spray level.

3. The method of claim 2, wherein the controlled volume of fluid ejected by the nozzle of the autonomous cleaning robot comprises a volume of fluid ejected per spray event.

4. The method of claim 2, wherein the multiple spray levels comprise a first spray level corresponding to a first spray volume in a range from 200 μL to 500 μL and a second spray level corresponding to a second spray volume in a range from 400 μL to 1000 μL.

5. The method of claim 1, wherein the multiple spray levels comprise a first spray level corresponding to the autonomous cleaning robot traveling in a range from 300 mm to 1400 mm between the consecutive ejections of fluid and a second spray level corresponding to the autonomous cleaning robot traveling in a range from 1400 mm to 2300 mm between the consecutive ejections of fluid.

6. The method of claim 1, wherein presenting the representation of each of the multiple spray levels comprises presenting a graphical representation of each of the multiple spray levels.

7. The method of claim 1, wherein presenting the representation of each of the multiple spray levels comprises presenting one or more of (i) a slider bar having multiple positions, each position corresponding to one of the spray levels or (ii) a radio button corresponding to each of the spray levels.

8. The method of claim 1, comprising:
presenting, in a user interface with the representation of each of the multiple spray levels, a representation of each of multiple cleaning intensities,
wherein the multiple cleaning intensities are selectable independently of the input indicative of the selection of the one of the spray levels.

9. The method of claim 8, wherein the multiple cleaning intensities are each associated with a corresponding rank overlap parameter for navigation by the autonomous cleaning robot during the wet cleaning mission.

10. The method of claim 1, wherein presenting the representation of each of the multiple spray levels comprises presenting a non-quantitative graphical or textual representation of each of the multiple spray levels.

11. The method of claim 1, comprising controlling the autonomous cleaning robot to execute a spot cleaning mission of an area, comprising:
controlling the autonomous cleaning robot to navigate the area in a first set of ranks according to a first rank orientation;
after controlling the autonomous cleaning robot to navigate the area in the first set of ranks, controlling the autonomous cleaning robot to navigate the area in a second set of ranks according to a second rank orientation different than the first rank orientation; and
after controlling the autonomous cleaning robot to navigate the area in the second set of ranks, controlling the autonomous cleaning robot to navigate a closed-loop perimeter of the area,
wherein navigation of the closed-loop perimeter is distinct from the navigation in the first set of ranks and the second set of ranks.

12. The method of claim 1, comprising:
receiving, at the mobile device, a second input to initiate the wet cleaning mission; and
controlling the autonomous cleaning robot to execute the wet cleaning mission responsive to receiving the second input.

13. The method of claim 1, in which controlling the autonomous cleaning robot to perform the wet cleaning mission comprises initiating a transmission to the autonomous cleaning robot comprising instructions to execute the wet cleaning mission according to the selected spray level.

14. The method of claim 1, comprising presenting, on the display of the mobile device, a summary of the wet cleaning mission, the summary comprising a representation of an amount of fluid spray consumed during the wet cleaning mission in accordance with the selected spray level.

15. The method of claim 1, comprising presenting, on the display of the mobile device, a summary of the wet cleaning mission, the summary comprising a map of an area cleaned by the autonomous cleaning robot during the wet cleaning mission.

16. A mobile device comprising:
an input device;
a display; and
one or more processors configured to:
present, on the display, a representation of each of multiple spray levels;
receive data representing an input received through the input device, the input being indicative of a selection of one of the spray levels; and
control an autonomous cleaning robot to perform a wet cleaning mission according to the selected spray level, including controlling a distance traveled by the autonomous cleaning robot between consecutive ejections of fluid from a nozzle of the autonomous cleaning robot according to the selected spray level.

17. The mobile device of claim 16, wherein controlling the autonomous cleaning robot to execute the wet cleaning mission according to the selected spray level comprises controlling a volume of fluid ejected by the nozzle of the autonomous cleaning robot according to the selected spray level.

18. The mobile device of claim 17, wherein the controlled volume of fluid ejected by the nozzle of the autonomous cleaning robot comprises a volume of fluid ejected per spray event.

19. The mobile device of claim 17, wherein the multiple spray levels comprise a first spray level corresponding to a first spray volume in a range from 200 μL to 500 μL and a second spray level corresponding to a second spray volume in a range from 400 μL to 1000 μL.

20. The mobile device of claim 16, wherein the multiple spray levels comprise a first spray level corresponding to the autonomous cleaning robot traveling in a range from 300 mm to 1400 mm between the consecutive ejections of fluid and a second spray level corresponding to the autonomous cleaning robot traveling in a range from 1400 mm to 2300 mm between the consecutive ejections of fluid.

21. The mobile device of claim 16, wherein presenting the representation of each of the multiple spray levels comprises presenting a graphical representation of each of the multiple spray levels.

22. The mobile device of claim 16, wherein presenting the representation of each of the multiple spray levels comprises presenting one or more of (i) a slider bar having multiple positions, each position corresponding to one of the spray levels or (ii) a radio button corresponding to each of the spray levels.

23. The mobile device of claim 16, wherein the one or more processors are configured to:
present, in a user interface with the representation of each of the multiple spray levels, a representation of each of multiple cleaning intensities,
wherein the multiple cleaning intensities are selectable independently of the input indicative of the selection of the one of the spray levels.

24. A non-transitory computer readable medium storing instructions for causing one or more processors of a mobile device to:
- present, on a display of the mobile device, a representation of each of multiple spray levels;
- receive, at the mobile device, an input indicative of a selection of one of the spray levels; and
- control an autonomous cleaning robot to execute a wet cleaning mission according to the selected spray level, including controlling a distance traveled by the autonomous cleaning robot between consecutive ejections of fluid from a nozzle of the autonomous cleaning robot according to the selected spray level.

\* \* \* \* \*